United States Patent [19]

Endo et al.

[11] Patent Number: 5,656,695
[45] Date of Patent: Aug. 12, 1997

[54] GOLF BALL

[75] Inventors: Seiichiro Endo, Akashi; Kuniyasu Horiuchi, Kobe, both of Japan

[73] Assignee: Sumitomo Rubber Industries, Ltd., Hyogo-ken, Japan

[21] Appl. No.: 365,539

[22] Filed: Dec. 28, 1994

[30] Foreign Application Priority Data

Dec. 28, 1993 [JP] Japan .................... 5-353232

[51] Int. Cl.$^6$ .................... A63B 37/12; A63B 37/06; C08L 33/02; C08L 23/08
[52] U.S. Cl. .................... 525/221; 525/196; 525/201; 473/372; 473/377; 473/378; 473/385
[58] Field of Search .................... 273/235 R; 525/221, 525/196, 201; 473/372, 377, 378, 385

[56] References Cited

U.S. PATENT DOCUMENTS

| | | | |
|---|---|---|---|
| 3,819,768 | 6/1974 | Molitor | 260/897 B |
| 4,801,649 | 1/1989 | Statz | 525/183 |
| 5,324,783 | 6/1994 | Sullivan | 525/196 |
| 5,328,959 | 7/1994 | Sullivan | 525/196 |

FOREIGN PATENT DOCUMENTS

| | | |
|---|---|---|
| 0 443706 | 8/1991 | European Pat. Off. . |
| 0 582487 | 2/1994 | European Pat. Off. . |
| 0 622409 | 11/1994 | European Pat. Off. . |
| 2 214515 | 6/1989 | United Kingdom . |
| 2 247682 | 11/1992 | United Kingdom . |
| 2264302 | 8/1993 | United Kingdom . |
| 2 277932 | 11/1994 | United Kingdom . |

OTHER PUBLICATIONS

Surlyn Product Guide—Du Pont Oct. 1993.

*Primary Examiner*—David Buttner
*Attorney, Agent, or Firm*—Birch, Stewart, Kolasch & Birch, LLP

[57] ABSTRACT

A scratch resistant golf ball cover comprising a blend of:

(I) an acrylic ionomer or mixture with a methacrylic ionomer having a stiffness modulus of 3000–5000 Kg/cm$^2$ (II) a methacrylic ionomer having a stiffness modulus of 900–2000 Kg/cm$^2$ neutralized with zinc.

1 Claim, No Drawings

GOLF BALL

FIELD OF THE INVENTION

The present invention relates to a golf ball. More particularly, it relates to a golf ball having excellent durability while maintaining excellent impact resilience and flying performances, and wherein the surface is not easily scratched at the time of contact with a short iron.

BACKGROUND OF THE INVENTION

Recently, an ionomer resin has been used exclusively as the base resin for a cover of golf balls (e.g. Japanese Laid-Open Patent Publication No. Sho49(1974)-49727). Particularly, in almost all of two-piece golf balls using a solid core, the ionomer resin is used as the base resin for the cover. This is because the ionomer resin is superior in durability, cut resistance and impact resilience and is easily molded.

However, the golf ball using the ionomer resin as the base resin for its cover needs further improvement in impact resilience, flying distance and the like. Particularly, users are asking the golf ball to fly as far as possible, with higher impact resilience and flying performances.

In order to satisfy the above demands, an acrylic ionomer having high impact resilience has been used as the base resin for the cover.

However, the acrylic ionomer is inferior in durability and it has a problem that the surface of the golf ball is easily scratched at the time of hitting with a short iron.

As described above, a golf ball having more excellent flying performances is desired by users, and measures taken for satisfying the request have uncovered other problems and drawbacks.

OBJECTS OF THE INVENTION

The main object of the present invention is to provide a golf ball having excellent durability while maintaining excellent impact resilience and flying performances, and whereas the surface is not easily scratched at the time of hitting with a short iron.

This object as well as other objects and advantages of the present invention will become apparent to those skilled in the art from the following description.

SUMMARY OF THE INVENTION

According to the present invention, by using a mixture of a high-rigid ionomer containing a predetermined amount of an acrylic ionomer and a soft ionomer in a specific proportion as the base resin for cover, the durability is improved while maintaining excellent impact resilience and flying performances. Also, it is difficult for the surface of the golf ball to be scratched at the time of hitting with a short iron, whereby the object of the present invention has been accomplished.

The present invention provides a golf ball having a core and a cover for covering the core, wherein said cover is composed of a base resin having a stiffness modulus of 1,000 to 4,000 Kg/cm$^2$ and said base resin is a mixture of the following two inomers in a weight ratio (I)/(II) of 98/2 to 60/40;

(I) an ionomer having a stiffness modulus of 3,000 to 5,000 Kg/cm$^2$, being an acrylic ionomer (A) neutralized with alkali metal ion or alkali earth metal ion, or a mixture of the acrylic ionomer (A) and a methacrylic ionomer (B) neutralized with alkali metal ion or alkali earth metal ion, an amount of the acrylic ionomer (A) in the mixture being 10 to 100% by weight (II) an ionomer having a stiffness modulus of 700 to 2000 kg/cm$^2$.

DETAILED DESCRIPTION OF THE INVENTION

In the present invention, the ionomer (I) is a high-rigid ionomer containing a predetermined amount of an acrylic ionomer (A) and, as described above, this ionomer (I) is composed of the acrylic ionomer (A) alone or composed of a mixture of the acrylic ionomer (A) and a high-rigid methacrylic ionomer (B), the amount of the acrylic ionomer (A) in the mixture being 10 to 100% by weight.

As described above, the reason why the ionomer (I) contains a predetermined amount of the acrylic ionomer (A) is that the acrylic ionomer (A) has particularly high impact resilience and the resiliency of the golf ball is good. Further, the reason why the amount of the acrylic ionomer (A) in the mixture is not less than 10% by weight when the ionomer (I) is prepared by mixing the acrylic ionomer (A) with the methacrylic ionomer (B) is as follows. That is, if the acrylic ionomer (A) is present in the ionomer (I) ion an amount of less than 10% by weight, the desired high impact resilience can not be obtained when mixing with ionomer (11) as the soft ionomer.

Further, the reason why the stiffness modulus of the ionomer resin (I) is specified to 3,000 to 5,000 kg/cm$^2$ is as follows. That is, the ionomer (I) is a high-rigid ionomer which is superior in impact resilience and when the stiffness modulus of the ionomer resin (I) is smaller than 3,000 kg/cm$^2$, the impact resilience deteriorates when mixing with the ionomer (II) as the soft ionomer so as to improve durability. Thus, the flying distance is likely to be reduced. On the other hand, when the stiffness modulus of the ionomer resin (i) is larger than 5,000 kg/cm$^2$, the durability and feeling (hit feeling) can not be improved sufficiently even when mixing (blending) with the ionomer (II).

On the other hand, the stiffness modulus of the ionomer (II) is 700 to 2,000 kg/cm$^2$ and this means that the ionomer (II) is a soft ionomer which has a low rigidity and is flexible. This ionomer (II) has a low impact resilience, but is soft and superior in durability. Therefore, by blending this ionomer (II) with the high-rigid ionomer (I), inferior durability (particularly ease of scratching of the ball surface at the time of hitting with a short iron) and inferior feeling as the drawback of the ionomer (I) can be improved.

In the present invention, the reason why the mixing ratio of the ionomer (I) to the ionomer (II) is specified to 98/2 to 60/40 is as follows. Advantages of both high-rigid ionomer (I) and soft ionomer (II) can be obtained simultaneously when the mixing ratio is within the above range, thereby obtaining a golf ball having a good durability and feeling while maintaining excellent impact resilience and flying performances.

That is, when the mixing ratio of the soft ionomer (II) is smaller than the above range, the durability is not sufficiently improved and the feeling is also hard and inferior. On the other hand, when the mixing ratio of the soft ionomer (II) is larger than the above range, the impact resilience is deteriorated and the flying performances are also deteriorated, which results in a heavy feeling.

Regarding the high-rigid ionomer (I), when the ratio of the ionomer (I) is smaller than the above range, it becomes impossible to maintain excellent impact resilience and flying performances of the ionomer (I). On the other hand, when the ratio of the ionomer (I) is larger than the above range, it becomes impossible to sufficiently improve the durability and feeling.

Examples of the high-rigid acrylic ionomer (A) include Iotek #7010 and Iotek #8000 (trade name, manufactured by Exxon Polychemical Co.). Examples of the high-rigid methacrylic ionomer (B) include Hi-milane #1605, Hi-milane #1706 and Hi-milane #1707 (trade name, manufactured by Mitsui Du Pont Polychemical Co., Ltd.).

Further, as the ionomer (II), a methacrylic ionomer neutralized with a zinc ion is preferred and the example of the ionomer (II) include Hi-milane #1855, Hi-milane #1702, Hi-milane #1650 and Hi-milane #1652 (trade name, manufactured by Mitsui Du Pont Polychemical Co., Ltd.).

In the golf ball of the present invention, the base resin for the cover of the above specific ionomer may contains pigments such as titanium dioxide, barium sulfate, etc. and antioxidants, if necessary. Further, other resins such as polyamide, polyethylene, polyester, polyurethane, etc. may be added to the base resin unless characteristics of the above base resin are not deteriorated (not more than 10% by weight).

In the present invention, the above cover can be used for coating a core for a solid golf ball and a core for a thread-wound golf ball.

The core for a solid golf ball may be not only a core for two-piece golf ball but also a core for a multi-layer, structured golf ball having three layers or more. For example, as the core for two-piece golf ball, those obtained by subjecting a rubber composition to a press vulcanization to compress with heating (e.g. at a temperature of 140° to 170° C. for 10 to 40 minutes) into a spherical vulcanized article can be used, said rubber composition being prepared by formulating 10 to 60 parts by weight of at least one cocrosslinking agent such as α,β-monoethylenically unsaturated carboxylic acids (e.g. acrylic acid, methacrylic acid, etc.) or metal salts thereof and functional monomers (e.g. trimethylolpropane trimethacrylate, etc.), 5 to 40 parts by weight of a filler (e.g. zinc oxide, barium sulfate, etc.), 0.5 to 5.0 parts by weight of a peroxide (e.g. dicumyl peroxide, etc.) and, if necessary, 0.1 to 1.0 part by weight of an antioxidant, based on 100 parts by weight of polybutadiene.

The core for a thread-wound golf ball is composed of a center and a thread rubber wound on the center. As the center, any of a liquid center and a rubber center can be used. As the rubber center, there can be used those obtained by vulcanizing the same rubber composition as that of the core for solid golf ball.

The thread rubber may be those which have hitherto been used. For example, there can be used those obtained by vulcanizing a rubber composition wherein an antioxidant, a vulcanizing accelerator and sulfur are formulated in a natural rubber or a natural rubber and synthetic polyisoprene. The core is not limited to the core for solid golf ball and core for thread-wound golf ball.

A method of coating the cover on the core is not specifically limited, but may be any normal method. For example, there can be employed a method comprising molding a composition for cover comprising the above specific ionomer as the resin into a semi-spherical half-shell in advance, covering a core with two half-shells and then subjecting to a pressure molding at 130° to 170° C. for 1 to 15 minutes, or a method comprising subjecting the composition for cover to an injection molding directly to cover around the core.

The thickness of the cover is normally about 1.0 to 4.0 mm. In case of molding of the cover, a dimple may be formed on the surface of the ball, if necessary. Further, if necessary, a paint finishing and stamping may be provided after cover molding.

As described above, according to the present invention, there could be provided a golf ball having an excellent durability while maintaining excellent impact resilience and flying performances, of which surface is not easily scratched at the time of hitting with a short iron.

EXAMPLES

The following Examples and Comparative Examples further illustrate the present invention in detail but are not to be construed to limit the scope thereof.

Examples 1 to 3 and Comparative Examples 1 to 5

To 100 parts by weight of cis-1,4-polybutadiene [JSR BR01 (trade name), manufactured by Japan Synthetic Rubber Co., Ltd], 30 parts by weight of zinc acrylate (manufactured by Nippon Shokubai Kagaku Kogyo Co., Ltd.), 20 parts by weight of zinc oxide (manufacture by Toho Zinc Co., Ltd.) and 1 part by weight of dicumyl peroxide (Nippon Oil & Fats Co., Ltd.) were added and the mixture was kneaded to prepare a rubber composition for core, which was subjected to a pressure molding at 150° C. for 30 minutes to give a core for solid golf ball of 38.5 mm in diameter.

On the other hand, ionomers of the formulation shown in Tables 1 and 2 were mixed, and 2 parts by weight of titanium dioxide ($TiO_2$) was added to 100 parts by weight of the resulting ionomer mixture and the mixture was subjected to coloring by an extruder to prepare a composition for cover. Further, the amount of ionomers in Tables 1 and 2 are parts by weight and the total amount is 100 parts by weight. Accordingly, the numerical value indicates % by weight based on the total weight, simultaneously.

In Tables 1 and 2, ionomers are represented by their trade name and, therefore, they will be explained the last of Table 2. The stiffness modulus of the ionomer (I) and the stiffness modulus of the ionomer mixture as the base resin of the cover are shown in Tables 1 and 2, and the measuring method of the stiffness modulus is as follows.

Measuring method of stiffness modulus:

It was measured using a stiffness modulus tester manufactured by Toyo Seiki Co., Ltd. A sample for measurement was prepared by making a flat plate due to a press molding and, after press molding, standing for 2 weeks in an atmosphere (23° C., humidity: 50%).

TABLE 1

|  | Example No. | | |
|---|---|---|---|
|  | 1 | 2 | 3 |
| Ionomer (A) | | | |
| Iotek #7010 *1 | 40 | 35 | 35 |
| Iotek #8000 *2 | 40 | 35 | — |
| Ionomer (B) | | | |
| Hi-milane #1605 *3 | — | — | — |
| Hi-milane #1706 *4 | — | 20 | 25 |
| Hi-milane #1707 *5 | — | — | 35 |
| Hi-milane #1557 *6 | — | — | — |
| Stiffness modulus of ionomer (I) (kg/cm$^2$) | 4000 | 3700 | 3400 |
| Ionomer (II) | | | |

TABLE 1-continued

|  | Example No. | | |
| --- | --- | --- | --- |
|  | 1 | 2 | 3 |
| Hi-milane #1855 *7 | 20 | 10 | 5 |
| Stiffness modulus (kg/cm$^2$) | 3400 | 3500 | 3100 |

TABLE 2

|  | Comparative Example No. | | | | |
| --- | --- | --- | --- | --- | --- |
|  | 1 | 2 | 3 | 4 | 5 |
| Ionomer (A) | | | | | |
| Iotek #7010 | — | 50 | — | 20 | 10 |
| Iotek #8000 | — | 50 | — | 20 | — |
| Ionomer (B) | | | | | |
| Hi-milane #1605 | 50 | — | 11 | — | — |
| Hi-milane #1706 | 50 | — | 42 | 10 | 10 |
| Hi-milane #1707 | — | — | 7 | — | — |
| Hi-milane #1557 | — | — | — | — | 50 |
| Stiffness modulus of ionomer (I) (kg/cm$^2$) | — | — | — | 3800 | 2800 |
| Ionomer (II) | | | | | |
| Hi-milane #1855 | — | — | — | 50 | 30 |
| AD8269 *8 | — | — | 28 | — | — |
| AD8265 *9 | — | — | 12 | — | — |
| Stiffness modulus (kg/cm$^2$) | 3500 | 4000 | 2100 | 2300 | 2200 |

*1: trade name, ionomer obtained by neutralizing with a zinc ion manufactured by Exxon Chemical Co., stiffness modulus: 1600 kg/cm$^2$
*2: trade name, ionomer obtained by neutralizing with a sodium ion manufactured by Exxon Chemical Co., stiffness modulus: 3800 kg/cm$^2$
*3: trade name, ionomer obtained by neutralizing with a sodium ion manufactured by Mitsui Du Pont Polychemical Co., stiffness modulus: 3100 kg/cm$^2$
*4: trade name, ionomer obtained by neutralizing with a zinc ion manufactured by Mitsui Du Pont Polychemical Co., stiffness modulus: 2600 kg/cm$^2$
*5: trade name, ionomer obtained by neutralizing with a sodium ion manufactured by Mitsui Du Pont Polychemical Co., stiffness modulus: 3000 kg/cm$^2$
*6: trade name, ionomer obtained by neutralizing with a zinc ion manufactured by Mitsui Du Pont Polychemical Co., stiffness modulus: 2100 kg/cm$^2$
*7: trade name, ethylene-methacrylic acid-acrylate three-dimensional copolymer obtained by neutralizing with a zinc ion manufactured by Mitsui Du Pont Polychemical Co., stiffness modulus: 900 kg/cm$^2$
*8: trade name, ethylene-methacrylic acid-acrylate three-dimensional copolymer obtained by neutralizing with a sodium ion manufactured by Mitsui Du Pont Polychemical Co., stiffness modulus: 400 kg/cm$^2$
*9: trade name, ethylene-methacrylic acid-methacrylate three-dimensional copolymer obtained by neutralizing with a sodium ion manufactured by Mitsui Du-Pont Polychemical Co., stiffness modulus: 700 kg/cm$^2$ The composition for cover thus prepared as described above was coated directly on a solid core by injection molding to give a two-piece golf ball. This golf ball was coated with a paint to prepare a golf ball of 42.7 mm in diameter.

The weight of the resulting golf ball, the ball compression (PGA system), the ball initial velocity, the flying distance (carry), the scratching resistance of the surface of the golf ball (resistance to scratching), the durability and the feeling according to practical hitting test were examined. The results are shown in Table 3. Further, the evaluation criteria and measuring method of the ball initial velocity, flying distance, scratching resistance and durability are as follows.

Ball initial velocity:

A golf ball is hit with a No. 1 wood club at a head speed of 45 m/second using a swing robot manufactured by True Temper Co. and a ball initial velocity is measured. The larger the ball initial velocity, the more excellent impact resilience of the golf ball are.

Flying distance (carry):

A golf ball is hit with a No. 1 wood club at a head speed of 45 m/second using a swing robot manufactured by True Temper Co. and a distance up to the point where the golf ball was dropped is measured.

Scratching resistance:

A golf ball is hit with a pitching wedge and it is observed whether a scratch is formed on the surface of the golf ball or not. The criteria of the evaluation results shown in Table 3 are as follows:

Evaluation criteria:

o: A scratch is not formed at all.

X: Some scratch is formed.

XX: Considerable scratch is formed.

Durability:

A golf ball is hit with a No. 1 wood club at a head speed of 45 m/second using a swing robot manufactured by True Temper Co., and the number of times until breakage is arisen is measured. The resulting value is indicated as an index in case of the value of the golf ball of Comparative Example 1 being 100.

Evaluation criteria of feeling:

o: Resiliency of golf ball is good, soft hit feeling

XA: Hit feeling is hard, and golf ball is easily scratched

XB: Hit feeling is soft but heavy, and resiliency of golf ball is inferior

TABLE 3

|  | Example No. | | | Comparative Example No. | | | | |
| --- | --- | --- | --- | --- | --- | --- | --- | --- |
|  | 1 | 2 | 3 | 1 | 2 | 3 | 4 | 5 |
| Ball weight (g) | 45.2 | 45.2 | 45.2 | 45.2 | 45.2 | 45.2 | 45.2 | 45.2 |
| Ball compression | 98 | 98 | 97 | 98 | 100 | 93 | 94 | 93 |
| Ball initial velocity (m/second) | 64.9 | 65.0 | 64.7 | 65.0 | 65.4 | 64.2 | 64.3 | 64.2 |
| Flying distance (yard) | 231 | 232 | 230 | 232 | 233 | 227 | 228 | 227 |
| Scratching resistance | O | O | O | X | XX | O | O | O |
| Durability | 110 | 109 | 117 | 100 | 89 | 139 | 133 | 133 |
| Feeling | O | O | O | XA | XA | XB | XB | XB |

As is apparent from the results shown in Table 3, the golf balls of Examples 1 to 3 exhibited the ball initial velocity and flying distance which are almost the same as those of the golf ball of Comparative Example 1 which corresponds to a conventional typical two-piece solid golf ball. Further, they had a large index indicating the durability and excellent scratching resistance.

That is, the golf balls of Examples 1 to 3 of the present invention exhibited that they are superior in durability while maintaining excellent impact resilience and flying performances, of which surface is not easily scratched at the time of hitting with a short iron.

To the contrary, the golf ball of Comparative Example 1 which corresponds to a conventional typical two-piece solid golf ball attained a large flying distance, but the feeling at the time of hitting was inferior and a scratch was easily formed on the surface of the golf ball at the time of hitting with a short iron. Further, the golf ball of Comparative Example 2 using only a high-rigid acrylic ionomer as the base resin for cover attained a large flying distance, but the feeling at the time of hitting was inferior and a scratch was easily formed on the surface of the golf ball at the time of hitting with a short iron.

Further, the golf ball of Comparative Example 3 using no acrylic ionomer attained a small flying distance, and the feeling was heavy at the time of hitting and the resiliency of the golf ball was inferior. Also, the golf ball of Comparative Example 4 wherein a mixing ratio of the ionomer (II), i.e. the soft ionomer was large attained a small flying distance, and the feeling was heavy at the time of hitting and the resiliency of the golf ball was inferior. The golf ball of Comparative Example 5 wherein the stiffness modulus of the ionomer (I) is small attained a small flying distance, and the feeling was heavy at the time of hitting and the resiliency of the golf ball was inferior.

What is claimed is:

1. A golf ball having a core and a cover for covering the core, wherein said cover is composed of a base resin having a stiffness modulus of 1,000 to 4,000 Kg/cm$^2$ and said base resin is a mixture of the following two ionomers in a weight ratio (I)/(II) of 98/2 to 60/40;

(I) an ionomer having a stiffness modulus of 3,000 to 5,000 Kg/cm$^2$, being an acrylic ionomer (A) neutralized with alkali metal ion, alkali earth metal ion or zinc ion, or a mixture of the acrylic ionomer (A) and a methacrylic ionomer (B) neutralized with alkali metal ion, alkali earth metal ion or zinc ion, an amount of the acrylic ionomer (A) in the mixture being 10 to 100% by weight, (II) an ionomer having a stiffness modulus of 900 to 2000 Kg/cm$^2$, being a methacrylic ionomer neutralized with zinc ion.

* * * * *